United States Patent Office 3,554,777
Patented Jan. 12, 1971

3,554,777
PRODUCTION OF PIGMENTARY TITANIUM DIOXIDE
Gerald Lederer, Hartburn, Stockton-on-Tees, John M. Rackham, Fairfield, Stockton-on-Tees, and John P. Humphreys, Marske-on-Sea, Redcar, England, assignors to British Titan Products Company Limited, Durham, England, a corporation of the United Kingdom
No Drawing. Filed Feb. 29, 1968, Ser. No. 709,212
Claims priority, application Great Britain, Mar. 10, 1967, 11,379/67
Int. Cl. C09c 1/36, 3/00; C09d 5/02
U.S. Cl. 106—300          18 Claims

ABSTRACT OF THE DISCLOSURE

The production of pigmentary titanium diodixe by depositing on the surface of the particles in aqueous dispersion a hydrous oxide of aluminum from an aqueous solution of an alkali metal aluminate and a hydrous oxide of silicon, the coating so obtained containing the hydrous oxide of silicon expressed as $SiO_2$ in an amount of from 60 to 90 molar percent and the hydrous oxide of aluminum expressed as $Al_2O_3$ in an amount of from 40 to 10 molar percent of the total coating and the amount of the coating being such as to contain from 9 to 15 percent by weight of $SiO_2$ based on the weight of uncoated titanium dioxide. Coating compositions comprising a binder and titanium dioxide pigment having been coated by the previously described process particularly those in which the binder is a film-forming polymer in aqueous emulsions.

---

This invention relates to the production of pigments particularly to titanium dioxide pigments having a coating adhering to the particles of pigment and to coating compositions incorporating such pigments.

According to the present invention a process of producing pigmentary titanium dioxide comprising depositing on titanium dioxide particles in an aqueous dispersion a coating of a hydrous oxide of silicon and a hydrous oxide of aluminium, the latter being deposited from an aqueous solution of an alkali metal aluminate, the proportions of the hydrous oxides deposited being such that after separation and drying of the treated titanium dioxide, the coating adhering to the particles of titanium dioxide contains the hydrous oxide of silicon expressed as $SiO_2$ in an amount of from 60 to 90 molar percent and the hydrous oxide of aluminium expressed as $Al_2O_3$ in an amount of from 40 to 10 molar percent of the total coating and the amount of said coating being such as to contain from 9 to 15 percent by weight of $SiO_2$ based on the weight of uncoated titanium dioxide.

The present invention also includes pigments produced by the process of the immediately preceding paragraph and coating compositions particularly aqueous emulsion paints containing the coated titanium dioxide particles as pigment.

The pigmentary titanium dioxide of the present invention will have a mean particle size within the range $0.15\mu$ to $0.5\mu$, particularly in the range $0.2\mu$ to $0.3\mu$. Preferably the particles should contain from 90 to 99.5 percent by weight of rutile $TiO_2$ on total $TiO_2$ content.

The process of the present invention generally involves the deposition on titanium dioxide particles of a coating comprising a hydrous oxide of silicon and a hydrous oxide of aluminium, the latter of which is deposited thereon from an aqueous solution of an alkali metal aluminate. Titanium dioxide particles which are to be so treated can be prepared by the well known "sulphate" process which involves, briefly, taking a titanium dioxide bearing ore, dissolving in sulphuric acid, clarification of the resultant liquor, hydrolysis of the liquor and calcination of the precipitated titanium dioxide. Subsequent to calcination the development of pigmentary properties usually involves milling of the titanium dioxide and coating the milled pigment to develop the desired properties. In this specification the titanium dioxide which is coated by the process of the invention can be the titanium dioxide prepared after the milling stage. The titanium dioxide prepared by the "sulphate" process can either be in the anatase form or in the rutile form and preferably is in the rutile form. Alternatively the titanium dioxide can be prepared by the vapour phase oxidation of a titanium tetrahalide such as titanium tetrachloride, and when this form of titanium dioxide is used then the product is predominantly in the rutile form.

Usually the titanium dioxide particles will be of normal habit but if desired a titanium dioxide pigment can be used in which at least some of the particles of titanium dioxide are of an irregular shape, e.g., acicular, that is particles of unequal length and width. If desired, the ratio of length to width can be as much as 8:1. Such acicular pigments can be produced by adding to the titanium dioxide prior to calcination a source of sodium and, if desired, either alumina or a silicate or both. The source of sodium can be sodium sulphate, sodium carbonate or sodium hydroxide for example. Typically, the source of sodium can be present in an amount between 0.5–2% by weight expressed as $Na_2O$ of titanium dioxide and alumina can be present in an amount of up to 0.5% by weight of titanium dioxide. The silicate can replace alumina if desired or can be present in addition to an amount of alumina. Additionally a source of phosphate radicals such as monammonium phosphate can be present.

Alternatively, acicular titanium dioxide pigments can be prepared by mixing an aqueous colloidal suspension of titanium dioxide nucleating seed particles with an acidic titanium chloride solution, heating said mixture to hydrolyse the titanium chloride present therein and precipitating the titanium as titanium dioxide and after separating the titanium dioxide from the reaction mixture, calcining the precipitate at a temperature of from 700–900° C. to prepare acicular titanium dioxide.

Acicular titanium dioxide pigments coated according to the process of the present invention have a substantially improved opacity when used in coating compositions.

The coating deposited according to the process of the present invention is usually deposited from a solution containing a water soluble silicate and a water soluble aluminate which give rise to the hydrous oxides of silicon and aluminium which are deposited on the pigment particles. Any type of water soluble silicate can be employed although more usually it will be an alkali metal silicate such as sodium silicate and the aluminate used is an alkali metal aluminate such as sodium aluminate.

In operation, the titanium dioxide in the form of an aqueous slurry or dispersion obtained from the milling and hydroclassification stages usually has added to it the water soluble silicate and the water soluble aluminate. The silicate and the aluminate can be added together to the slurry, or separately in any order, but preferably the water soluble aluminate is added to the slurry first followed by the silicate. If desired the aluminate can be generated in situ in the titanium dioxide slurry and this can be effected by adding first a water soluble salt of aluminium such as aluminium sulphate followed by a strong alkali such as sodium hydroxide in an amount sufficient to raise the pH to a value of not less than 10 to form the aluminate and then adding a water soluble silicate to the slurry. Alternatively, the strong alkali can be added first followed by the soluble aluminium salt. The aluminate can be added as a solid or as an aqueous solution to the slurry of titanium dioxide.

After the addition of the coating reagents to the titanium dioxide slurry it is stirred vigorously for a period of at least half an hour at a temperature of usually about 40° C. After the slurry in admixture with the coating reagents has been stirred for the required length of time, a mineral acid is added to the mixture, usually, to reduce the pH to a value of approximately 4 to 6 which ensures that the final packed pigment will have a pH of 7 to 8.5. After the addition of the mineral acid which can be, for example, sulphuric acid, the mixture is usually stirred for a further length of time, preferably not less than half an hour and usually at a temperature rather higher than that employed during the treatment of the pigment slurry with the mixed silicate and aluminate solution. Conveniently the temperature which is maintained during the treatment with the mineral acid can be about 50° C. and this can be maintained by the use of steam or heating coils.

The amounts of water soluble silicate and aluminate added to the pigment slurry are such as to give the desired coating composition in the desired amount on the pigment.

As stated previously it is conventional practice to mill the calcined titanium dioxide prior to coating. This can be effected in the presence of a dispersing agent which can be a water soluble silicate, for example, an alkali metal silicate, and if such a silicate is employed as dispersing agent prior to coating of the titanium dioxide particles according to the present invention then the amount of silicate employed as a dispersing agent during the milling stage should be considered to be coating silicate for the purpose of this invention and accordingly adjustment in the amount of silicate added as coating reagent during the subsequent coating process may be made.

At the completion of the coating stage the pigment particles having the adhering coating of the hydrous oxide of silicon and the hydrous oxide of aluminium are filtered from the aqueous slurry and dried. If necessary a flocculating agent can be added to the aqueous slurry prior to filtration, a typical agent being magnesium sulphate in an amount up to 0.25 percent by weight expressed as MgO based on $TiO_2$ content. The coated pigment particles may then be subjected to a further milling process, for example, in a fluid energy mill and this can be done once or twice according to the particular properties desired in the final pigment. In addition this milling can be carried out in the presence of an organic reagent which has a property of conferring on the pigment increased wettability with water and typical reagents for this purpose are polyols, such as pentaerythritol and alkanolamines, such as triethanolamine.

The pigment produced according to the process of the present invention is particularly suitable for use in the manufacture of coating compostions particularly aqueous emulsion paints, for example those containing a pigment volume concentration in the range 35 to 80%. The use of the pigment in such a high pigment volume concentration confers on the resultant aqueous emulsion paint an improved performance compared with conventional titanium dioxide pigments. The binder employed in emulsion paints can be any of the conventional film forming binders such as polymers of vinyl esters of aliphatic monocarboxylic acids having from 2 to 8 carbon atoms such as vinyl acetate; polymers of acrylic or methacrylic alkyl esters containing from 1 to 10 carbon atoms in the alkyl group, such as methyl-, ethyl-, propyl- or butyl-acrylates or methacrylates; polymers or copolymers of acrylonitrile; polymers or copolymers of vinylidene chloride; polymers of styrene or butadiene or copolymers of these substances; copolymers of styrene or butadiene and diesters of maleic or fumeric acids or terpolymers of vinyl esters of monocarboxylic acids with alkyl acrylates or alkyl methacrylates and an unsaturated monocarboxylic acid such as a copolymer of vinyl acetate, methyl methacrylate and acrylic acid.

The coated pigment according ot the present invention can also be used in the manufacture of 'flat" paints and oleoresinous paints.

The coated pigments have a very high hiding power or opacity and tintorial strength and a very low reactivity with the paint medium, particularly in aqueous emulsion paints which ensures a very low degree of thickening of the paint on standing.

The invention is illustrated in the following examples:

EXAMPLE 1

A slurry of calcined rutile titanium dioxide was prepared containing 700 g.p.l. of titanium dioxide and sodium silicate in an amount equivalent to that containing 0.15% of silicon dioxide based on the weight of titanium dioxide. The slurry was milled in a sand mill for 60 minutes and after milling was diluted so that it contained 249 g.p.l. of titanium dioxide.

Two separate 3 litre samples of the slurry were placed in separate mixing vessels equipped with stirrers and means to heat the slurries to a temperature of 40° C. To one of these vessels containing the 3 litres of slurry there was added 28.5 millilitres of a solution containing 459 g.p.l. of sodium aluminate whilst stirring vigorously, followed by 691 milliliteres of a solution containing 100 g.p.l. of sodium silicate. The mixture was stirred for half an hour whilst maintaining the temperature at 40° C. and the temperature was then raised to 50° C. and 190 millilitres of sulphuric acid (10%) added. This reduced the pH of the mixture to 5.2 and stirring was continued at this higher temperature for a further half hour. This treated pigment (A) slurry was then filtered and the pigment washed. The washed pigment was then treated with triethanolamine in an amount of 0.3% by weight based on the weight of titanium dioxide.

The second 3 litre sample was treated in a similar manner but employing 33.5 millilitres of the sodium aluminate solution, 817 millilitres of the sodium silicate solution and 320 millilitres of the sulphuric acid to give a pigment (B) slurry. This was then filtered, washed and treated with the triethanolamine.

The two pigments A and B so obtained were then dried and milled in a fluid energy mill.

Pigment A had a coating consisting of a hydrous oxide of silicon and a hydrous oxide of aluminium and the amount of hydrous oxide of silicon, expressed as $SiO_2$, was 9.25% by weight and the amount of hydrous oxide of aluminium, expressed as $Al_2O_3$, was 1.75%, both based on the weight of titanium dioxide.

Pigment B also had a coating of a hydrous oxide of silicon and a hydrous oxide of aluminium the amount of hydrous oxide of silicon, expressed as $SiO_2$ was 10.94% by weight and the amount of hydrous oxide of aluminium expressed as $Al_2O_3$ was 2.06% by weight, both being based on the weight of titanium dioxide.

Each treated pigment A and B were used to prepare super white emulsion paints according to the following formulations:

|  | Weight percent |
|---|---|
| Pigment A or B | 30.0 |
| Calcium carbonate | 5.4 |
| Aluminium silicate | 2.7 |
| Sodium hexametaphosphate (5% solution) | 3.1 |
| Hydroxyethylcellulose (3% solution) | 12.7 |
| Water | 18.9 |
| Butyl carbitol acetate | 0.3 |
| Phenylmercury preservative | 0.1 |
| Vinyl acetate/acrylic copolymer latex (55% solids) | 26.8 |

The paint prepared had a pigment volume concentration of 48% and a solids content of 53%. The paint had a pure white finish and a high degree of brightness. The use of pigment A or B enables paints to be made according to the above formulation having a higher degree of opacity and a lower reactivity than paints prepared using titanium dioxide having a conventional coating based on titanium dioxide, a hydrous oxide of aluminium and a hydrous oxide of silicon.

EXAMPLE 2

A slurry of calcined rutile titanium dioxide was prepared containing 700 g.p.l. of titanium dioxide and sodium silicate in an amount equivalent to that containing 1% of silicon dioxide based on the weight of titanium dioxide. The slurry was milled in a sand mill for 60 minutes and after milling was diluted so that it contained 241.8 g.p.l. of titanium dioxide.

Two separate 3 litre samples of the slurry were placed in separate mixing vessels equipped with stirrers and means to heat the slurries to a temperature of 40° C. To one of these vessels containing the 3 litres of slurry there was added 78.8 millilitres of a solution containing 460.0 g.p.l. of sodium aluminate while stirring vigorously followed by 725 millilitres of a solution containing 100 g.p.l. of sodium silicate. The mixture was stirred for half an hour whilst maintaining the temperature at 40° C. and the temperature was then raised to 50° C. and 380 millilitres of sulphuric acid (10%) added. This reduced the pH of the mixture to 5.0 and stirring was continued at this higher temperature for a further half an hour. This treated pigment (C) slurry was then filtered and the pigment washed.

The second 3 litre sample was treated in a similar manner but employing 94.6 millilitres of the sodium aluminate solution, 871 millilitres of the sodium silicate solution and 440 millilitres of the sulphuric acid to give a pigment (D) slurry. This was then filtered and washed.

The two pigments C and D so obtained were then dried and milled in a fluid energy mill.

Pigment C had a coating consisting of a hydrous oxide of silicon and a hydrous oxide of aluminium and the amount of hydrous oxide of silicon expressed as $SiO_2$ was 10.0% by weight and the amount of the hydrous oxide of aluminium expressed as $Al_2O_3$ was 5.0%, both based on the weight of titanium dioxide.

Pigment D also had a coating of an hydrous oxide of silicon and an hydrous oxide of aluminium with the amount of hydrous oxide of silicon expressed as $SiO_2$ being 12.0% by weight and the amount of hydrous oxide of aluminium expressed as $Al_2O_3$, being 6.0% by weight, both being based on the weight of titanium dioxide.

Each treated pigment C and D were used to prepare super white emulsion paints according to the formulation given in Example 1.

The paints prepared had very similar properties to those in Example 1.

EXAMPLE 3

A titanium dioxide pigment which had been prepared by adding to uncalcined titanium dioxide 0.9% by weight of sodium sulphate expressed as $Na_2O$, 0.5% by weight of $Al_2O_3$ and 0.2% by weight of monammonium phosphate expressed as $P_2O_5$. The pigment was calcined at a temperature of from 850–950° C. to give a pigment having a rutile content of at least 95% by weight expressed on total $TiO_2$ content and having particles which were acicular.

The acicular pigment so prepared was coated by the process as described for pigment C in Example 2 so that it had a coating consisting of a hydrous oxide of silicon in an amount of 10% by weight expressed as $SiO_2$ and a hydrous oxide of aluminium expressed as $Al_2O_3$ of 5% by weight both based on the weight of uncoated titanium dioxide.

A mill base solution was made by mixing the following components until a homogeneous solution was obtained:

| | Amounts in grams |
|---|---|
| Water | 3,164 |
| 5% solution of sodium polymetaphosphate | 1,120 |
| 5% of a solution of a polyacrylate dispersant | 1,000 |
| 2½% of a solution of a hydroxymethyl cellulose thickener | 2,856 |
| Butyl Cellosolve acetate | 98 |
| 10% ammonia solution | 140 |
| Phenyl mercurial fungicide | 14 |

The percent solutions are all expressed as weight for weight percentages.

122.5 grams of the homogeneous solution so obtained was stirred with 61 grams of talc having a particle size of $20\mu$ and 75 grams of the acicular pigment. The mixture so obtained was milled on a high speed stirrer for 5 minutes to form a mill base.

77.5 grams of an aqueous emulsion of a vinyl acetate/acrylic copolymer latex containing 54% solids was mixed with 207.5 grams of the mill base and the mixture stirred until homogeneous. The resultant paint was a white paint having a pigment volume concentration of 47% which could be tinted as required.

The water demand for the coated acicular pigment and for pigment C of Example 2 were determined and compared with a conventional rutile titanium dioxide pigment as control having a coating of a hydrous oxide of titanium in an amount of 2% expressed as $TiO_2$, a hydrous oxide of aluminium in an amount of 3% expressed as $Al_2O_2$ and a hydrous oxide of silicon in an amount of 1% expressed as $SiO_2$. The hydrous oxide of titanium and of aluminium were deposited together on the control pigment from a mixed solution of titanyl sulphate and aluminium sulphate. The results are shown below:

WATER DEMAND

| | Ball point | Flow point |
|---|---|---|
| Acicular pigment | 76–82 | 86–90 |
| Pigment C | 47 | 57 |
| Control | 29 | 34 |

The results clearly show the improvement obtained by using the process of the present invention and the additional improvement obtained by using an acicular titanium dioxide pigment.

What is claimed is:

1. A process of producing pigmentary titanium dioxide which comprises depositing on titanium dioxide particles a coating of a hydrous oxide of silicon and a hydrous oxide of aluminum, by adjusting the pH of a dispersion of titanium dioxide particles in an aqueous solution containing an alkali metal silicate and an alkali metal aluminate to effect deposition of both the hydrous oxide of silicon and the hydrous oxide of aluminum on the titanium dioxide particles, the proportions of the hydrous oxides deposited being such that after separation and drying of the treated titanium dioxide, the coating adhering to the particles of titanium dioxide contains the hydrous oxide of silicon expressed as $SiO_2$ in an amount of from 60 to 90 molar percent and a hydrous oxide of aluminium expressed as $Al_2O_3$ in an amount of from 40 to 10 molar percent of the total coating and the amount of said coating being such as to contain from 9 to 15 percent by weight of $SiO_2$ based on the weight of uncoated titanium dioxide.

2. A process according to claim 1 in which the titanium dioxide has a mean weight particle size within the range $0.2\mu$ to $0.3\mu$.

3. A process according to claim 1 in which the titanium dioxide contains from 90 to 99.5 percent by weight of rutile $TiO_2$ on total $TiO_2$ content.

4. A process according to claim 1 in which the titanium dioxide to be coated is in the form of an aqueous slurry or dispersion to which is added the water-soluble silicate and the water-soluble aluminate.

5. A process according to claim 4 in which the water-soluble silicate and the water-soluble aluminate are added together to the slurry.

6. A process according to claim 4 in which the water-soluble silicate and the water-soluble aluminate are added separately to the slurry.

7. A process according to claim 4 in which the water-soluble silicate and the water-soluble aluminate are added to the slurry in the form of an aqueous solution or solutions.

8. A process according to claim 4 in which the water-soluble aluminate is added to the slurry as a solid to form a solution of said aluminate in said slurry.

9. A process according to claim 4 in which said water-soluble aluminate is generated in situ in said slurry by adding to said slurry a water-soluble salt of aluminium and a strong alkali to raise the pH to a value of not less than 10 to form the desired aluminate.

10. A process according to claim 9 in which water-soluble silicate is added to the slurry after the generation in situ of said aluminate.

11. A process according to claim 1 in which the titanium dioxide is stirred vigorously in the presence of the coating reagents for a period of at least 30 minutes.

12. A process according to claim 11 in which a mineral acid is added to the stirred slurry in an amount sufficient to reduce the pH of the slurry to a value of from 4 to 6

13. A process according to claim 12 in which the slurry is stirred vigorously for a period of at least 30 minutes after the addition of the mineral acid.

14. A process according to claim 1 in which the titanium dioxide prior to coating is milled in the presence of a dispersing agent.

15. A process according to claim 14 in which the dispersing agent is a water-soluble silicate.

16. A process according to claim 1 in which at least some of the particles of titanium dioxide to be coated are acicular.

17. A process according to claim 16 in which the acicular particles have a ratio of length to width of up to 8:1.

18. A process according to claim 1 in which the coated titanium dioxide particles are separated and dried.

References Cited

UNITED STATES PATENTS

| | | | |
|---|---|---|---|
| 3,035,966 | 5/1962 | Siuta | 106—300X |
| 3,251,705 | 5/1966 | Rieck et al. | 106—300 |
| 3,316,204 | 4/1967 | Lederer | 106—300X |
| 3,383,231 | 5/1968 | Allan | 106—300 |
| 3,437,502 | 4/1969 | Werner | 106—300 |
| 3,449,271 | 6/1969 | O'Connor | 106—300X |

TOBIAS E. LEVOW, Primary Examiner

H. M. SNEED, Assistant Examiner

U.S. Cl. X.R.

106—308; 260—29.6, 29.7